Feb. 20, 1962 S. ABRAMS 3,021,616
SPOT BOWLER'S RULE
Filed Oct. 19, 1959
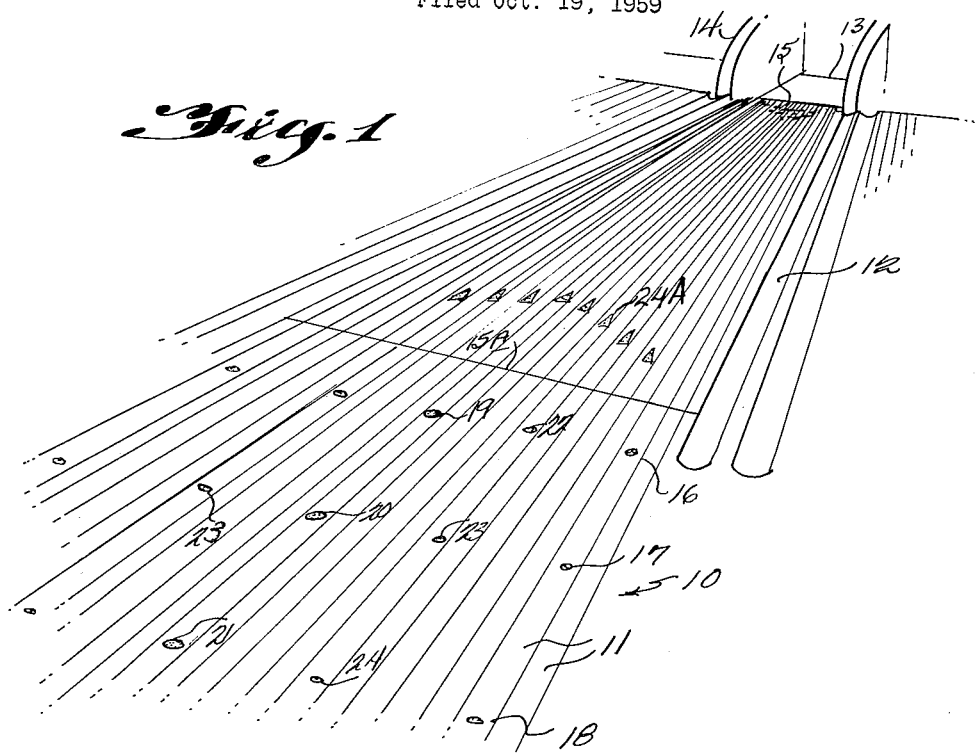
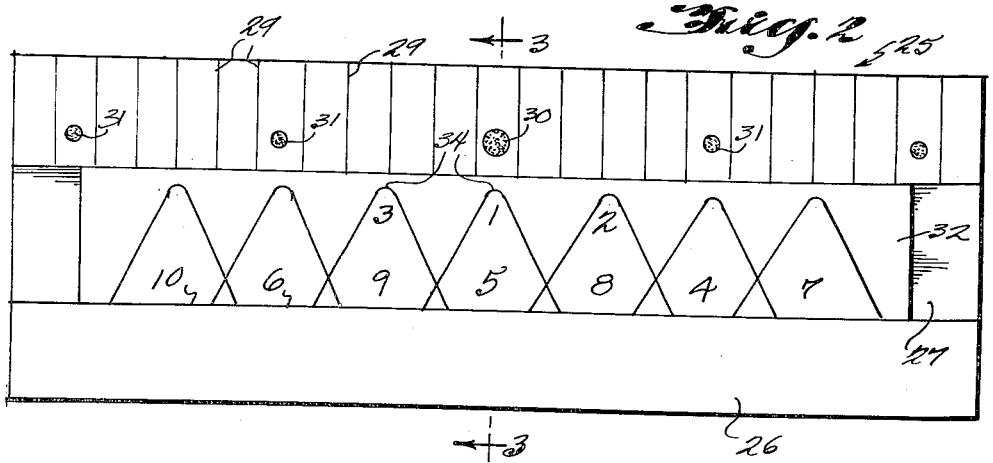
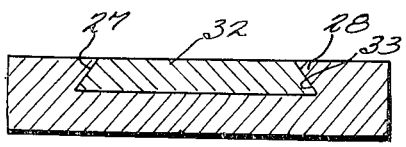
INVENTOR
SIMON ABRAMS
BY
Kimmel & Crowell
ATTORNEYS

United States Patent Office 3,021,616
Patented Feb. 20, 1962

3,021,616
SPOT BOWLER'S RULE
Simon Abrams, 1015 Dewey St., Freeland, Pa.
Filed Oct. 19, 1959, Ser. No. 847,289
1 Claim. (Cl. 35—29)

This invention relates to a spot bowler's rule, or gauge, and has as its primary object the provision of a mechanical adjustable rule, or gauge, for determining the proper position of a spot bowler's pivot foot to assist in aligning the bowler, and, hence, the ball when the bowler is attempting to roll various pin combinations.

A further object of the invention is the provision of such a rule or gauge which is relatively small, and which may be carried by the bowler from alley to alley, as desired.

An additional object of the invention is the provision of such a gauge or rule which may be readily employed by any bowler who employs the spot method of bowling.

A further object of the invention is the provision of such a device which is sturdy and durable in construction, extremely reliable and efficient in operation, and which is relatively simple and inexpensive to manufacture and assemble.

As conducive to a clearer understanding of this invention, it may here be pointed out that in spot bowling the spot bowler determines by experimentation the spot over which he is to roll all balls, from the strike ball, to a ball selected to strike any single pin or normal combination of pins which may be downed by a single ball.

Heretofore there has been considerable difficulty in the case of any bowler other than an expert, in determining the exact position at which the pivot foot, that is the foot which carries the weight of the body when the first step of the approach is taken, is to be placed for single pins or various combinations of pins.

An important object of this invention is, therefore, to provide a gauge which, once the strike position of the bowler has been determined, and the spot over which he is to roll to obtain such a strike has been determined by experimentation, may then be set to indicate the exact position of the bowler's pivot foot relative to the spots on the alley in order to enable him to hit any given single pin, or normal combination of pins which may be struck by a single ball or a properly deflected pin.

Still other objects will in part be obvious, and in part be pointed out as the description of the invention proceeds, and shown in the accompanying drawing wherein there is disclosed a preferred embodiment of this inventive concept.

In the drawing:

FIGURE 1 is a perspective view of a bowling alley employing the arrangement of spots for spot bowlers;

FIGURE 2 is a top plan view of the gauge or rule of the instant invention; and

FIGURE 3 is a sectional view taken substantially along the line 3—3 of FIGURE 1.

Similar reference characters refer to similar parts throughout the several views of the drawing.

Having reference now to the drawing in detail, and more particularly to FIGURE 1, there is generally indicated a conventional bowling alley at 10, which is comprised of a plurality of aligned parallel boards 11 in the conventional manner. The usual gutters 12, pit 13, and ball return device 14, portions of the latter being omitted, are provided, as are the spots 15 at the end of the alley upon which the pins are to be positioned. The foul line is indicated at 15A, and at the back of the foul line there are positioned three rows of spots designated respectively as rows 16, 17 and 18. Each row includes a relatively large central spot 19, 20 and 21, respectively, and spaced transversely therefrom, usually at a distance of five (5) boards from the center spot are additional spots, which are conventionally smaller than the central spot, the latter spots of row 16 being indicated at 22, those of row 17 being indicated at 23, and those of row 18 being indicated at 24. All of the spots 22, 23 and 24 are transversely aligned, and are equidistantly spaced from their respective center spots. These spots are positioning spots and are aligned with an additional row of spots 24A on the alley over which the ball should roll, the arrangement being such that after a bowler has once determined over which spot 24A, or between which spots he should roll for maximum accuracy, he may continue to roll over the same spot and by continued practice obtain a degree of accuracy which cannot normally be obtained by ordinary indiscriminate methods.

The gauge or rule of the instant invention, as shown in FIGURES 2 and 3, is for the purpose of providing a mechanical means for positioning exactly the pivot foot relative to the boards of the alley and the spots thereon for any given single pin, or combination of pins, which, when once set to the requirements of the individual bowler, will indicate to him at all times the proper position of the pivot foot for any desired pin, or combination thereof.

The rule of the instant invention, generally indicated at 25, is comprised of an elongated rectangular body 26 having a centrally disposed longitudinally extending dove-tailed groove 27 therein. The sides of the groove 27 are inclined in upward convergent relation, as indicated at 28 in FIGURE 3.

The body 26 is of a size conveniently to be carried in the pocket and may be formed of wood, light metal, plastic, or any other suitable material. Along one edge of the block 26 are a plurality of division lines 29, dividing the top surface of the block into spaces, each of which represents one of the boards in the alley. Since the number of these boards is usually constant, one gauge is adapted to be employed for the majority of conventional bowling alleys. A central spot 30 is marked and corresponds in position to the longitudinal row of spots 19, 20 and 21 along the center board of the alley, while equi-distantly spaced to the sides of the spot 30 at intervals of five (5) boards are corresponding spots 31, which correspond in alignment and position to the spots 22, 23 and 24 as aligned in any given vertical arrangement in the rows 16, 17 and 18.

Slidably positioned in the dove-tailed groove 27 is a movable slide 32, the edges of which are outwardly beveled as at 33, to correspond to the bevels or dove-tails 28. The movable marker is provided with a series of triangular wedge-shaped indicia 34 with their apices pointing toward the section of the body marked off to indicate the boards of the alley. Each of these wedge-shaped indicia bears a number which corresponds to the relative position of one of the pins on the alley. The three centrally positioned wedges, which also correspond in position to the head pin and pins No. 2 and 3, are each marked for two (2) pins. The arrangement is obviously such that the member 32 may be moved longitudinally in the groove 27, so that, assuming that the spot bowler rolls over the spot 24A aligned with spot 30 for a strike ball, the wedge indicated at the center with the markings 1 and 5 corresponding to the "5" pin is then exactly aligned with the central spot 30. If the bowler is then bowling for the "10" pin, his pivot foot will be positioned in the relative position on the alley which corresponds to the position of the pin "10" on the gauge. Similarly, if the bowler, in order to bowl a strike ball, rolls over the spot 24A on the alley corresponding to the spot 31 on the gauge, directly to the right of the spot 30, the entire slide is moved so that the wedge marked 1 is in direct alignment with the spot 31. The bowler then positions his pivot foot relative to the alley in the position marked on the movable scale to correspond to the spot on the alley in which he should stand to roll over the spot 24A aligned with the right-hand spot 31 to strike the "10" pin.

From the foregoing, it will now be seen that there is herein provided a spot bowler's gauge or rule which accomplishes all of the objects of this invention, and which greatly enhances the bowler's accuracy, by defining exactly the position which his pivot foot should take in order to strike a desired pin or combination of pins, and thus adds materially to the individual bowler's score.

As various embodiments may be made of this inventive concept, and as various modifications may be made in the embodiment hereinbefore shown and described, it is to be understood that all matter herein is to be interpreted merely as illustrative and not in a limiting sense.

I claim:

A gauge for use with a bowling alley comprising, an elongated body block having a top surface provided with a plurality of block indicia thereon arranged in a linearly extending, parallel relationship to correspond to the boards of a bowling alley, spot indicia arranged within said block indicia at selected intervals, a movable gauge section mounted in said block for reciprocal longitudinal movement, said movable gauge section having a plurality of triangular indicia thereon with the apices of said triangular indicia pointing toward said block indicia, and said triangular indicia being spaced so that the position of each triangular indicium corresponds to the relative position of a bowling pin when placed in the correct position on a bowling alley.

References Cited in the file of this patent

UNITED STATES PATENTS

| | | |
|---|---|---|
| 1,667,812 | Miller | May 1, 1928 |
| 2,498,421 | Hertig | Feb. 21, 1950 |
| 2,942,358 | Pomranz | June 28, 1960 |